United States Patent [19]

Wittensoldner et al.

[11] Patent Number: 5,023,818

[45] Date of Patent: Jun. 11, 1991

[54] LASER SCANNER SAFETY APPARATUS AND METHOD

[75] Inventors: Christopher J. Wittensoldner; John K. Burkey; Denis M. Blanford, all of Cambridge, Ohio

[73] Assignee: NCR Corporation, Dayton, Ohio

[21] Appl. No.: 410,685

[22] Filed: Sep. 21, 1989

[51] Int. Cl.⁵ .................... G06K 7/10; G08B 23/00
[52] U.S. Cl. ................... 364/551.01; 235/470; 318/272
[58] Field of Search ................... 364/550, 551.01; 235/467, 470, 472; 318/254, 264, 275, 272; 363/21, 97

[56] References Cited

U.S. PATENT DOCUMENTS

| | | | |
|---|---|---|---|
| 4,006,343 | 2/1977 | Izura et al. | 235/470 |
| 4,253,018 | 2/1981 | Amacher et al. | 235/463 |
| 4,272,675 | 6/1981 | Blanford et al. | 235/463 |
| 4,275,380 | 6/1981 | Gardner et al. | 235/463 |
| 4,282,426 | 8/1981 | Neseem et al. | 235/463 |
| 4,287,507 | 9/1981 | Janes et al. | 235/463 |
| 4,431,912 | 2/1984 | Dickson et al. | 235/466 |
| 4,567,360 | 1/1986 | Yamada | 235/472 |
| 4,575,625 | 3/1986 | Knowles | 235/467 |
| 4,639,606 | 1/1987 | Boles et al. | 250/555 |
| 4,672,215 | 6/1987 | Howard | 235/472 |
| 4,679,154 | 7/1987 | Blanford | 364/525 |
| 4,709,195 | 11/1987 | Hellekson et al. | 318/254 |
| 4,709,370 | 11/1987 | Bednarz et al. | 372/38 |
| 4,733,400 | 3/1988 | Thyzel et al. | 372/51 |
| 4,734,841 | 3/1988 | Elliot et al. | 363/97 |
| 4,763,336 | 8/1988 | Stephens | 372/81 |
| 4,845,349 | 7/1989 | Cherry | 235/462 |

Primary Examiner—Felix D. Gruber
Attorney, Agent, or Firm—Wilbert Hawk, Jr.; Albert L. Sessler, Jr.

[57] ABSTRACT

A scanning device having a laser, a motor for driving a mirror arrangement for moving the beam of the laser, and a microprocessor for control purposes is provided with a system for measuring and correcting fault conditions to meet laser safety requirements. Detection devices are provided for determining whether the laser is on or off, and whether the motor is running at or above a predetermined speed. If the laser is stuck in an on condition, then the motor is left running and an error is signalled. If the motor will not operate at or above the minimum speed, the laser is maintained in an off condition and an error is signalled.

8 Claims, 6 Drawing Sheets

LASER SCANNER SAFETY APPARATUS AND METHOD

CROSS-REFERENCE TO RELATED APPLICATION

Scanning System Motion Detection Apparatus and Method, U.S. patent application Ser. No. 410,698, filed Sept. 21, 1989 inventors Christopher J. Wittensoldner and Paul O. Detwiler.

BACKGROUND OF THE INVENTION

This invention relates to laser scanner safety apparatus, and more particularly relates to such an apparatus for detecting fault conditions involving the laser being improperly maintained in an activated condition and a motor in the scanner not operating or operating at an inadequate speed.

The use of symbols or labels which comprise bar codes as a means for identifying data which is used in processing items sold in the retail industry, and for other purposes as well, has been widely accepted. A particular bar code, known as the Universal Product Code (UPC), has been established as the industry standard for the grocery and other related retail industries. In a multiple bar code, such as the UPC, each decimal number or character is represented by two pairs of vertical bars and spaces within a seven-bit pattern wherein a binary one bit is represented by a dark module or bar of a predetermined width and a binary zero is represented by a light module or space. Thus, for example, the decimal character one may be represented in the UPC code by the seven-bit pattern 0011001. In keeping with the format, the decimal one would be comprised of an initial space of a two-bit width, followed by a two-bit wide bar, another two-bit space and a one-bit wide bar. For each character or decimal value of the system, there are two bars and two spaces which have a total width of seven modules or bits. The width of each of the bars or spaces which comprise a character may be one, two, three or four modules wide, so long as the sum of the bars and spaces is seven bits or modules wide.

In present day merchandise checkout systems, the use of optical scanners or readers for scanning the UPC labels on purchased merchandise items has become quite common. In the checkout systems in use today, the optical reader can take the form of a reader mechanism located in a checkout counter, or the form of a hand-held wand. In either case, the optical reader will scan the bar code pattern that forms the UPC label, and will generate signals representing the bars and spaces of the pattern for transmission to a processor which determines the character represented by the bar code pattern. The character which identifies the purchased items is then transmitted to an associated data terminal device and from there to a remote or back office processor which looks up the price of the item in a table located in the processor. The price is then transmitted back through the terminal device, where the price is printed on a receipt by a printer mechanism located in the terminal device, and then to a customer display member located adjacent to the checkout counter where the price of the item is displayed. If an error occurs due to a malfunction of the printer or if the price of the item is not listed in the price-lookup table, error signals are generated, notifying the operator to take appropriate actions to correct the situation.

During operation of an optical scanner, it is important for safety reasons that the laser beam not be stationary for an extended period of time, since injury might otherwise be incurred by a person whose eye, for example, is contacted by the laser beam. One example of a scanning system having a motor-driven scanning element, and associated method, which automatically shuts down a scanning laser when the motor is either inoperative or operating below a safe speed is disclosed in the copending patent application Serial No. 387,551, filed July 28, 1989, inventor Donald A. Collins, Jr., assigned to the assignee of the present application.

SUMMARY OF THE INVENTION

In the present invention, a scanning system includes apparatus for detecting faults in a laser scanner, and for alerting a processing device in the scanner to enable corrective action to be taken.

In accordance with one embodiment of the invention, record media scanning apparatus comprises: a laser for providing a scanning beam; laser power supply means for providing power to drive said laser; a motor for driving a movable element forming part of said scanning apparatus, said motor having sensing means associated therewith for sensing the speed of operation of said motor and for providing an output signal which varies in accordance with the speed of said motor; motor driver means for driving said motor; detection means coupled to said laser power supply means for detecting when said laser is operating and providing an output signal which varies in accordance with whether or not said laser is operating; logic means coupled to said detection means and to said sensing means of said motor and capable of producing a logical output signal which is dependent upon the output signals from said detection means and said sensing means of said motor; microprocessor means for controlling said laser power supply means and said motor drive means coupled to said logic means; laser operating signal coupling means coupled to said microprocessor means and to said laser power supply means; and motor operating signal coupling means coupled to said microprocessor means and to said motor driver means; whereby said microprocessor means is capable of controlling the operation of said motor and said laser power supply means in accordance with the logical output signal received from said logic means.

In accordance with another aspect of the invention, a method of operation of a record media scanning apparatus having a laser and a motor for driving a movable element forming part of said apparatus, comprises the following steps: initially turning on the motor and turning the laser off; turning the motor off and maintaining the laser off determining that the motor is initially inoperative; turning on the motor and determining whether it reaches a predetermined minimum speed within a predetermined time period; providing a failure indication if said motor does not attain said minimum speed within said predetermined time period; turning on the laser if the laser is initially off and if said motor has attained said minimum speed; maintaining a continuing monitoring of motor speed and turning off said laser if motor speed drops below said predetermined minimum; monitoring the operator activity at the scanning apparatus and turning off said laser and said motor if there is no such operator activity for a predetermined period of time; after said period of inactivity has been exceeded and said laser and said motor have been turned off, determining whether there is motion representing operator activity in the vicinity of said record media scanning apparatus; and turning on said laser and said motor in response to the sensing of such motion representing operator activity.

It is accordingly an object of the present invention to provide a simple, effective laser scanner safety apparatus.

Another object is to provide a method for detecting and correcting laser and motor fault conditions in a laser scanner.

Another object is to provide an apparatus for detecting laser and motor fault conditions in a laser scanner.

With these and other objects, which will become apparent from the following description, in view, the invention includes certain novel features of construction and combinations of parts, a preferred form or embodiment of which is hereinafter described with reference to the drawings which accompany and form a part of this specification.

DESCRIPTION OF THE PREFERRED EMBODIMENT

Figure 1:
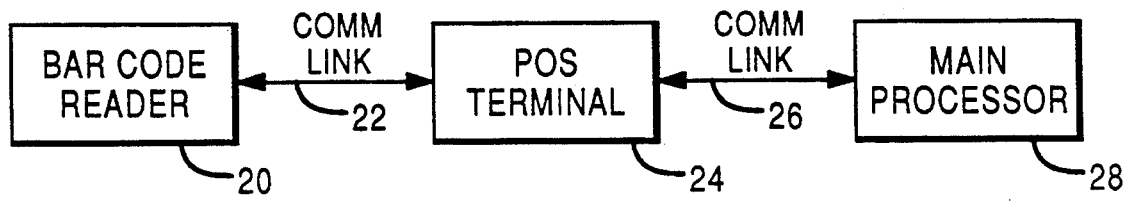
FIG. 1 is a block diagram of a system including a bar code reader, a point of sale terminal and a main processor.

Referring now to FIG. 1, there is shown a block diagram of a checkout system which may embody the present invention. This system includes a bar code reader 20 for scanning a coded label on a purchased merchandise item and for generating coded signals representing the identity of the purchased item. These signals are transmitted over a communications link 22 to a terminal device 24, shown here as a point of sale terminal, which in turn transmits the signals over a further communications link 26 to a main processor 28. The processor 28, utilizing the signals received, determines the price of the purchased item from a price look-up table stored in the processor 28. The numerical data representing the price is transmitted over the communications link 26 to the terminal device 24 which prints the price on a receipt. The data may also be transmitted over the communications link 22 to the reader 20 which actuates a customer display to display the price of the item purchased to the customer. The bar code reader is not limited to use in merchandise systems, as it may be used in a wide variety of other applications, such as the checking in and out of library books and other materials, for example.

Figure 2:
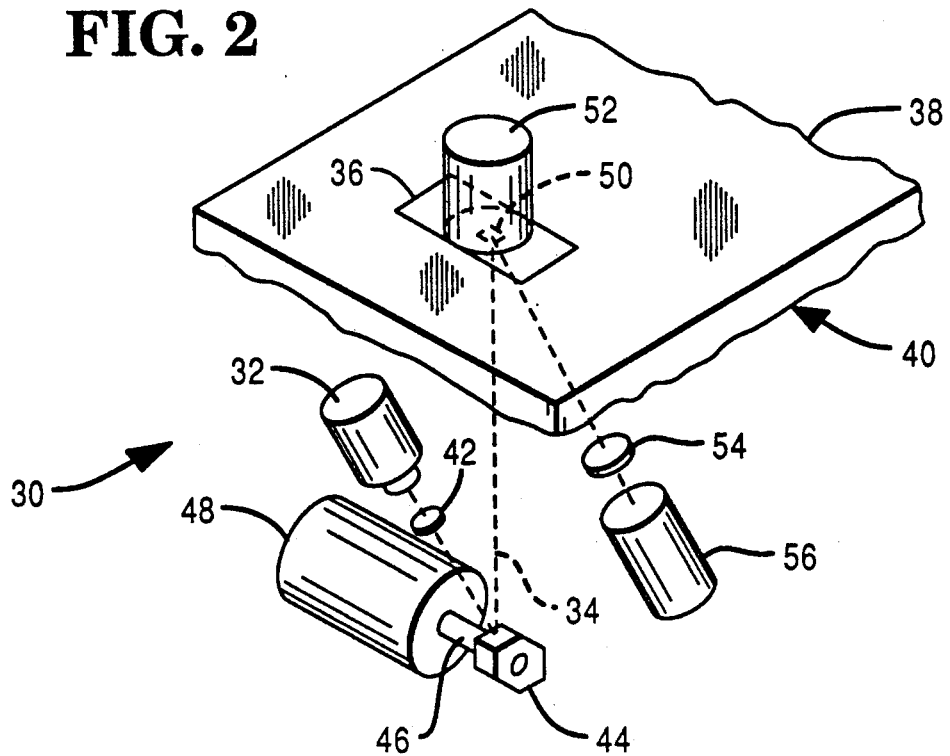
FIG. 2 is a fragmentary perspective view of the mechanical elements of a bar code reader.

Referring now to FIG. 2, there is shown a perspective view of the mechanical structure of the bar code reader 20 which includes a scanner assembly generally indicated by the numeral 30, comprising a light source 32 emitting an optical scanning light beam 34 in the visible or near visible spectrum, the light beam being directed through an aperture 36 located in a supporting surface 38 of a checkout counter 40. The light source 32 may be a laser diode or may be a helium-neon laser that is pumped to produce a continuous laser beam of red monochromatic light of approximately 6,328 angstrom wave length, such as a type 1007p-63 manufactured by Uniphase, Manteca, Calif.

In a manner that is well-known in the art, the light beam 34 produced by the source 32 may be focused by a lens system 42 onto a multi-faced mirror 44. The mirror 44 is mounted on the shaft 46 of a spinner motor 48 which rotates the mirror 44 at a substantially constant speed. The mirror 44 is positioned to intercept the light beam 34 and projects the same through the aperture 36 to scan the encoded indicia on a label 50 fixed to a merchandise item 52. In a typical UPC symbol, the encoded data on the label 50 comprises a plurality of black coded areas and white coded areas representing data. The rotation of the mirror 44 causes a succession of light beams 34 to scan any encoded label 50 positioned over the aperture 36.

The light beam is reflected off the label 50 through an optical filter 54 to a photo-responsive pick-up device such as a photo-multiplier 56 which converts the reflected light beam into electrical signals, the amplitude of which correspond to the amounts of light received. Thus, the amplitude of the light reflected from the white coded areas on the label 50 will be greater than the light reflected from the black coded areas. Conventional amplifying circuits will produce a relatively high voltage which can be assigned a binary one value when the beam 34 is scanning a black coded area on the label and a relatively low voltage which can be assigned a binary zero value when the beam 34 is scanning a white coded area. Thus, the information contained on the label 50 can be decoded and used as an input to a processor for use in generating the price of the purchased item 52.

Figure 3:
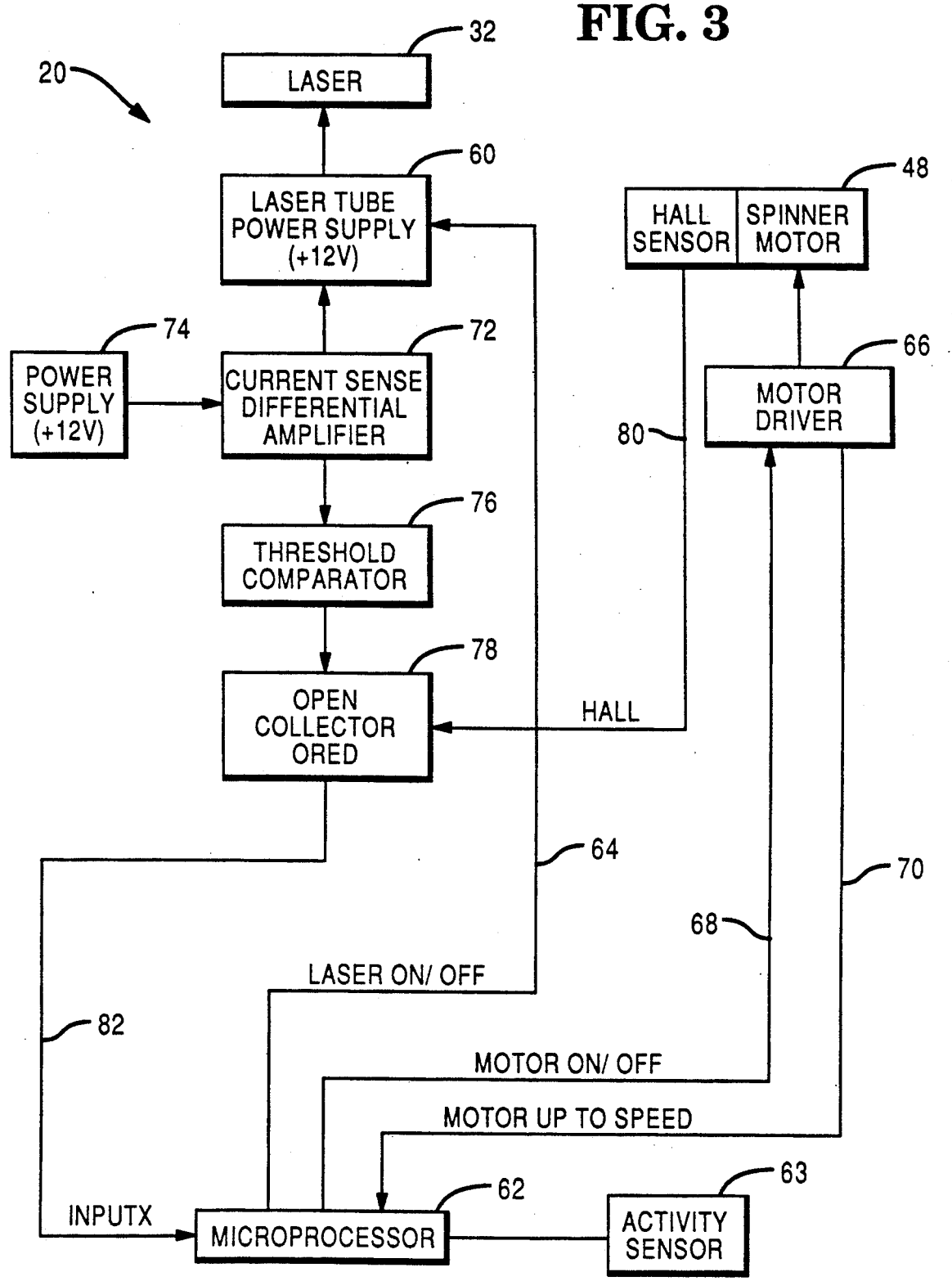
FIG. 3 is a block diagram of certain elements of a bar code reader, particularly showing the laser and motor operating circuitry.

Referring now to FIG. 3, shown there is a partial block diagram of that portion of the bar code reader 20 which relates to the fault detection apparatus of the present invention. The laser 32 may be in the form of a HeNe gas discharge laser tube which requires a DC to DC converting power supply 60 which will transform 12 volts to 1200 volts. A microprocessor 62 which serves a number of functions in the bar code reader 20 controls the power supply 60 by means of a "laser on/off" control line 64 coupling the microprocessor 62 and the power supply 60. The microprocessor 62 may be of type 8052, manufactured by Intel Corporation, and also controls a motor driver 66 for the spinner motor 48 by means of a "motor on/off" line 68 coupling the microprocessor 62 and the motor driver 66. The spinner motor 48 is a one, two or three phase motor which incorporates an open collector Hall effect sensor 49 or appropriate other type of sensor, such as a laser detect strip on the motor associated with a photodiode, whose voltage is toggled with the current direction of the coil it is next to. Also coupling the microprocessor 62 and the motor driver 66 is a "motor up to speed" line 70 which provides motor speed information to the microprocessor 62.

A current sense differential amplifier 72 is provided with a +12-volt power supply 74 and provides an output to a threshold comparator 76 which is dependent on whether or not the laser 32 is turned on. This is determined by coupling the current sense differential amplifier 72 to the laser tube power supply 60, as shown in FIG. 3. The threshold comparator 76 output signal has reference voltage levels representing the on and off states of the laser tube power supply. The open collector ORed circuit 78 is coupled to the threshold comparator 76 and is also coupled by line 80 to the Hall sensor 49 associated with the spinner motor 48 to receive Hall effect signals from said motor, indicating its rotation and speed or lack thereof. The circuit 78 thus provides a logical OR function with respect to signals indicating the condition of the laser 32 and the spinner motor 48, and generates an INPUTX signal on line 82 which couples the circuit 78 to the microprocessor 62. The microprocessor 62 utilizes the INPUTX signal on line 82 and the "motor up to speed" signal on line 70 to control the state of the "laser on/off" signal on the line 64 and the "motor on/off" signal on the line 68.

For a more detailed description of the bar code reader 20 and the bar code which is read, reference may be had to the following United States patents, which are assigned to the assignee of the present application: 4,253,018, issued Feb. 24, 1981; 4,272,675, issued June 9, 1981; 4,275,380, issued June 23, 1981; 4,282,426, issued Aug. 4, 1981; 4,287,507, issued Sept. 1, 1981; and 4,679,154, issued July 7, 1987.

Figure 4:
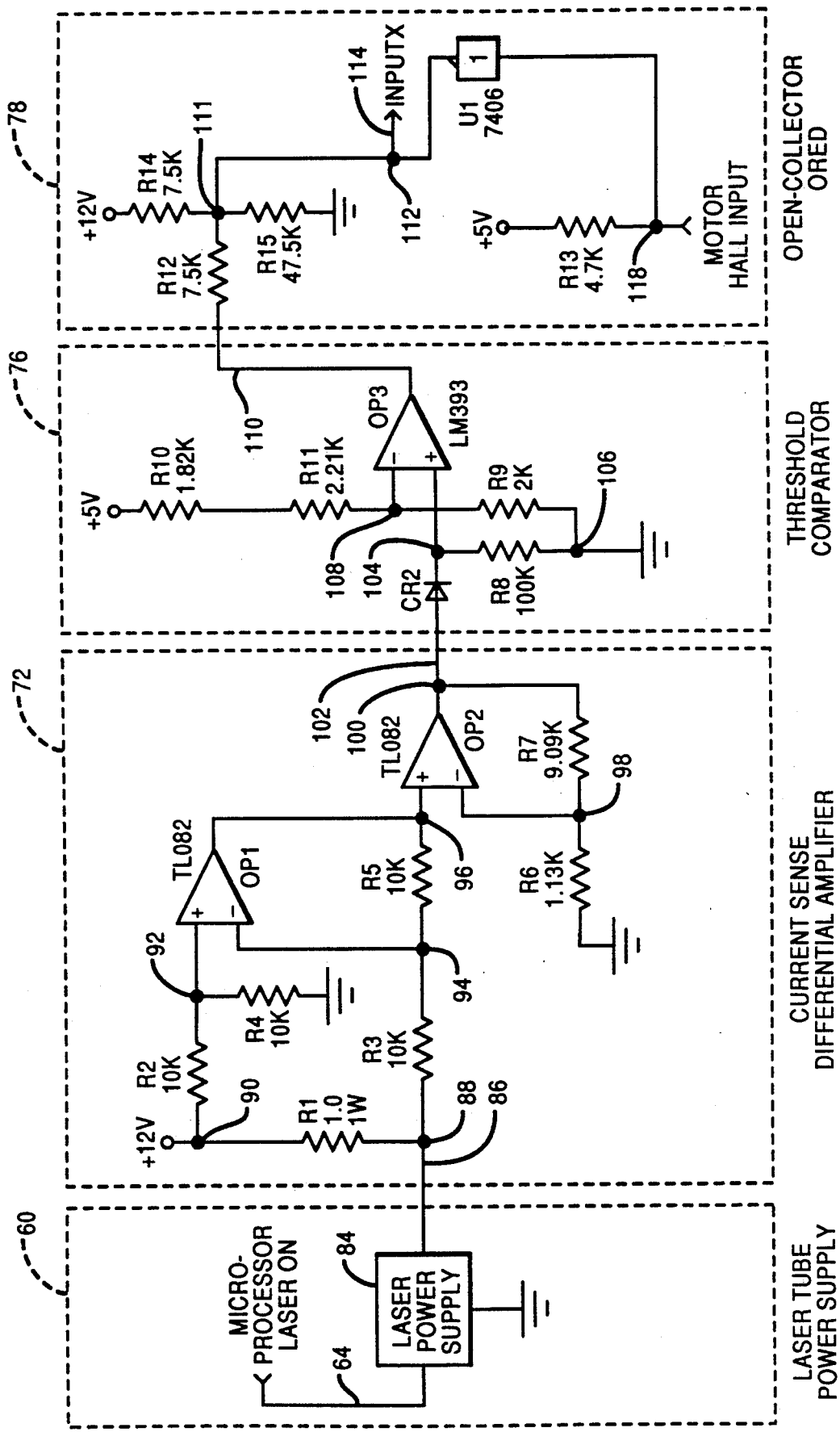
FIG. 4 constitutes a circuit diagram of certain elements of the block diagram of FIG. 3.

Referring to FIG. 4, the laser tube power supply 60 is shown within a dashed-line block, and includes a laser power supply 84, which may be of type 103-17, manufactured by Laser Drive, Gibsonia, Pa. As previously mentioned, the power supply is controlled from the microprocessor 62 by a signal on the line 64. It is provided with a ground connection, and is coupled to the current sense differential amplifier 72 by a conductor 86.

The current sense differential amplifier 72 is shown in FIG. 4 within a dashed-line block. From a node 88 on the conductor 86, a first circuit branch extends through a 1-ohm resistor R1 and a node 90 to a +12-volt source of potential. From the node 90, a circuit path extends through a 10K-ohm resistor R2 and a node 92 to the plus input of an operational amplifier OP1, which may be of type TL082, manufactured by Motorola Semiconductor Products, Phoenix, Ariz. From the node 92, a circuit path extends through a 10K-ohm resistor R4 to ground. From the node 88, a circuit path extends through a 10K-ohm resistor R3 and a node 94 to the negative input of the amplifier OP1. The output of the amplifier OP1 is connected to a node 96, which is connected to the node 94 through a 10K-ohm resistor R5. The node 96 is connected to the plus input of a second operational amplifier OP2, which may be of type TL082. The negative input of the amplifier OP2 is connected to ground through a node 98 and a 1.13K-ohm resistor R6. The output of the amplifier OP2 is connected through a node 100 and a 9.09K-ohm resistor R7 to the node 98. The output of the amplifier OP2 is also connected to a conductor 102 which extends to the threshold comparator 76. It may be noted that any operational amplifier with a common mode input of half the system power supply could be employed. All resistors are 1% tolerance.

The resistor R1 is in series with the supply voltage to the laser power supply and creates a voltage drop proportional to the current draw of the laser power supply. This current drop is dependent on whether or not the laser is turned on. The resistors R2, R3, R4, R5 and the amplifier OP1 create a differential amplifier with a gain of one, outputting the voltage drop across the resistor R1. The resistors R6, R7 and the amplifier OP2 form a noninverting amplifier of the voltage drop of the resistor R1 with a gain of approximately ten. The output of the amplifier OP2 is then fed to the threshold comparator 76.

The threshold comparator 76 is shown in FIG. 4 within a dashed line block. The conductor 102 from the current sense differential amplifier extends through a diode CR2 and a node 104 to the plus input of a comparator OP3, which may be of type LM393, manufactured by Motorola Semiconductor Products. A circuit branch extends from the node 104 through a 100K-ohm resistor R8 and a node 106 to ground. A circuit branch extends from the node 106 through a 2K-ohm resistor R9, a node 108, a 2.21K-ohm resistor R11 and a 1.82K-ohm resistor R10 to a +5-volt source of potential. The node 108 is connected to the negative input of the comparator OP3. The output of the comparator OP3 extends through a conductor 110 to the open collector ORed circuit 78.

The resistors R10, R11 and R12 create a reference voltage that represents a level between the amplified "laser on/off" resistor R1 voltage drop. The comparator OP3 compares the output of the amplifier OP2 against the reference voltage. The output of the comparator OP3 is an open collector reflecting the laser 32 being on/off open/low respectively. The diode CR2 provides protection for the maximum input voltage to the comparator OP3. The resistor R8 provides bias for the input to the comparator OP3. Any comparator with the appropriate input offset voltage level and an open collector output can be used in place of the LM393 comparator.

All of the resistor values are 1% except for the resistor R8, which is 5%.

The open collector ORed circuit 78 is shown in FIG. 4 within a dashed line block. The conductor 110 extends through a 7.5K-ohm resistor R12 to a node 111. A voltage divider extends from a +12-volt source of potential through a 7.5K-ohm resistor R14, the node 111 and a 4.75K-ohm resistor R15 to ground. A conductor 114 on which the signal INPUTX appears is also connected to a node 112, which is electrically the same as the node 111.

The Hall effect input from the motor 48 is connected through a node 118 to the input of an inverter U1, which may be of type 7406, manufactured by Texas Instruments, Dallas, Tex. The node 118 is also connected through a 4.7K-ohm resistor R13, which functions as a pull-up resistor, to a +5-volt source of potential. The output of the inverter U1 is connected to the node 112. The signals from the inverter U1 and the comparator OP3 are thus tied together, creating an OR function having an output designated as INPUTX.

Figure 5A:
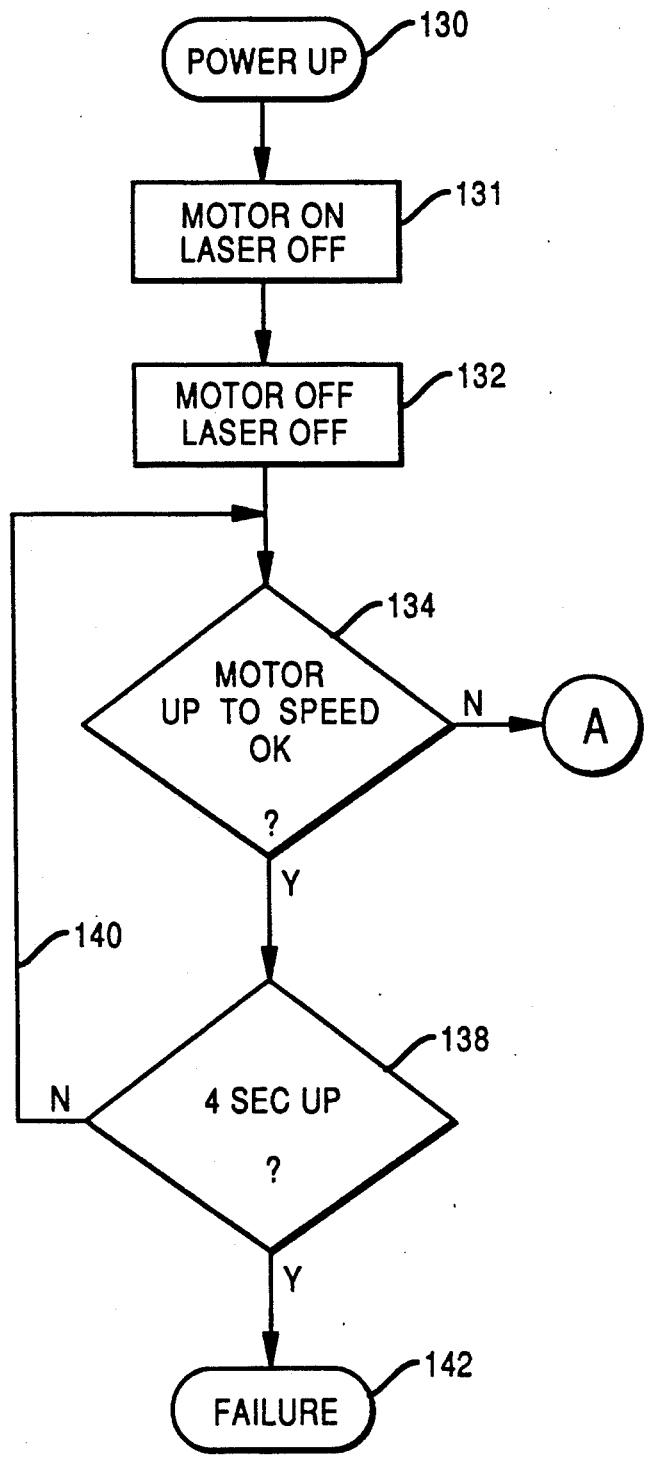
FIGS. 5A, 5B and 5C, taken together, constitute a flow diagram showing the microprocessor program for operation of the fault detection system of the present invention.
Figure 5B:
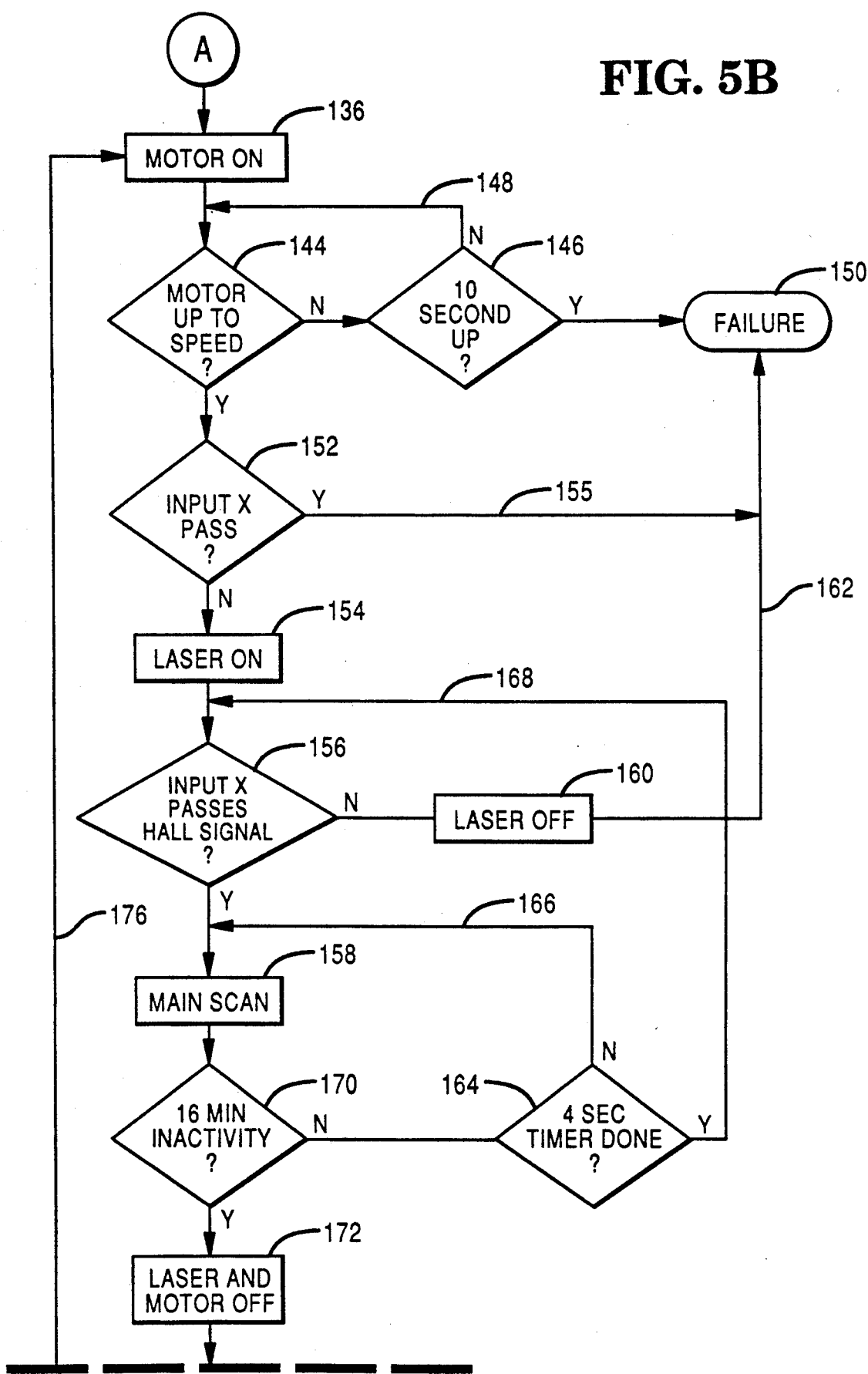
Figure 5C:
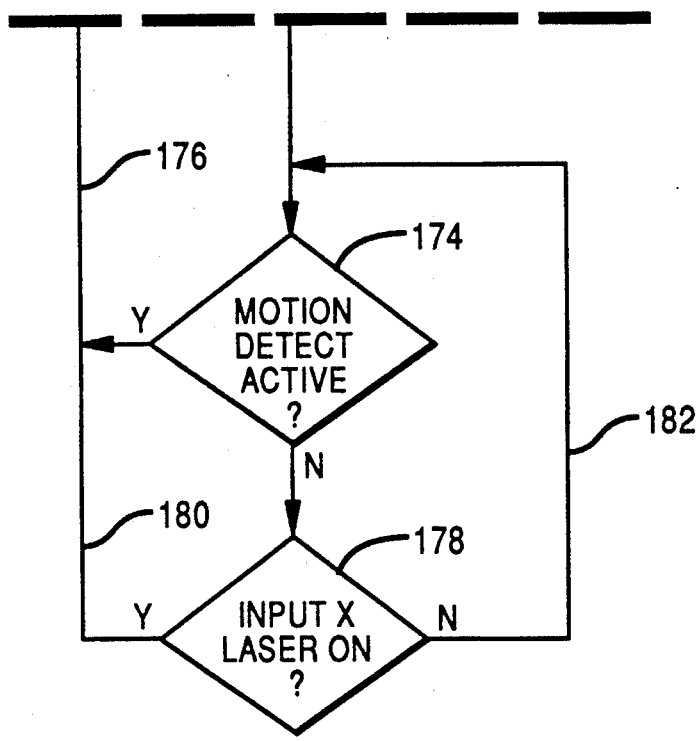

Shown in FIGS. 5A, 5B and 5C is a flow diagram representing the process controlled by programming of the microprocessor 62 to cause a bar code reader embodying the present invention to determine the presence of faults arising from the failure of the laser 32 to be deactivated or the failure of the motor 48 to operate at a speed which equals or exceeds a predetermined minimum, and to take appropriate action if these faults are found to exist.

Referring now to FIG. 5A, the process shown therein begins when power is applied to the bar code reader 20, as represented by block 130. On power up, the laser 32 is set to an off condition, and the spinner motor 48 is turned on, as a default condition. This is represented in block 131. The processor 62 then turns the motor 48 off, so that both laser and motor are turned off, as represented by block 132. The processor 62 then verifies that the "motor up to speed" signal reflects this condition of the motor being off, as represented by block 134. If the motor is below minimum speed, the process continues, as represented by connecting symbol "A", from FIG. 5A to FIG. 5B, and thence to block 136, which shows the motor 48 being turned on. If the test performed in block 134 indicates that the motor 48 is already at or above the predetermined minimum speed, a four-second timer is checked, as represented by block 138. So long as the timer has not expired, the "motor up to speed" signal is retested, as represented by path 140. If the timer expires with the motor still operating at or above the predetermined speed, a failure is indicated in block 142, an error tone is sounded by the speaker of the bar code reader 20, and the laser 32 is kept in an off condition.

When the motor 48 has been turned on by the microprocessor, as represented in block 136, the process continues in the manner illustrated in FIGS. 5B and 5C. The motor speed is then checked, as represented in block 144 by the "motor up to speed" signal. If the motor is not up to speed, a ten-second timer is provided, as represented in block 146, to enable the motor to attain the required minimum speed. During the timing period, the process returns via the path 148 to block 144. If the timer expires, a failure is indicated, as represented in block 150. If the "motor up to speed" signal is true, then the INPUTX signal is checked, as represented in block 152, and should remain low, since the laser 32 is off and the output of the comparator OP3 is low. If this is not the case, the process continues over path to block 150, representing a failure condition, and the laser is maintained in an off condition. Assuming that the INPUTX signal remains low, the laser 32 is turned on.

When the laser 32 is on, the comparator OP3 output becomes floating, allowing the INPUTX signal to pass the Hall effect motor signal from the inverter U1. The processor 62 now checks the signal INPUTX as a verification that the motor is up to speed by monitoring the pulses of the signal INPUTX (block 156). If the INPUTX pulses show that the motor 48 is up to speed, then the main scan loop is performed, as represented in block 158. If motor speed falls below the predetermined minimum, the laser 32 is turned off, as represented by block 160, and a failure is indicated (path 162). During the main scan loop, the INPUTX signal is checked every four seconds (block 164) to assure that the motor 48 is up to speed. So long as the speed is properly maintained, the loop returns to the main scan block via path 166. If the four second time period expires and the motor is not up to speed, the process returns to block 156 over path 168.

Scanner operator inactivity is monitored, as represented in block 170, in the manner disclosed and claimed in the copending application Serial No. 410,698 of the present assignee, and represented in FIG. 3 by block 63 labelled "ACTIVITY SENSOR". After sixteen minutes of scanner operator inactivity, the scanner goes into what may be called a sleep mode, and the laser 32 and the motor 48 are turned off, as represented by block 172, by "laser off" and "motor off" signals on the lines 64 and 68, respectively, of FIG. 3. When the laser 32 is turned off, the comparator OP3 sets the signal INPUTX low and keeps it low.

The motion detect circuit is monitored, as represented by block 174 (FIG. 5C). When motion is detected, representing operator activity, the process returns over path 176 to the "motor on" status of block 136. If, during the sleep mode, and when no motion is detected, the "laser on/ off" signal fails and the laser comes on, as represented in block 178, the signal INPUTX goes high and the process returns over paths 180 and 176 to the "motor on" block 136, from where the process continues through block 152 which, since the INPUTX signal is high, will cause a failure indication (block 150). So long as the laser is off, with the system in a sleep mode and no operator activity, the process continues to loop through blocks 174 and 178 and a return path 182 to the block 174. When operator activity resumes, the motor 48 is turned on, and the test loop is repeated, through block 152, for the INPUTX signal.

While the form of the invention illustrated and described herein is particularly adapted to fulfill the objects aforesaid, it is to be understood that other and further modifications within the scope of the following claims may be made without departing from the spirit of the invention.

What is claimed is:

1. Record media scanning apparatus, comprising:
   a laser for providing a scanning beam;
   laser power supply means for providing power to drive said laser;
   a motor for driving a movable element forming part of said scanning apparatus, said motor having sensing means associated therewith for sensing the speed of operation of said motor and for providing an output signal which varies in accordance with the speed of said motor;
   motor driver means for driving said motor;
   detection means coupled to said laser power supply means for detecting when said laser is operating and providing an output signal which varies in accordance with whether or not said laser is operating;
   logic means coupled to said detection means and to said sensing means of said motor and capable of producing a logical output signal which is dependent upon the output signals from said detection means and said sensing means of said motor;
   microprocessor means for controlling said laser power supply means and said motor driver means coupled to said logic means;
   laser operating signal coupling means coupled to said microprocessor means and to said laser power supply means; and
   motor operating signal coupling means coupled to said microprocessor means and to said motor driver means;
   whereby said microprocessor means is capable of controlling the operation of said motor and said laser power supply means in accordance with the logical output signal received from said logic means.

2. The record media scanning apparatus of claim 1, in which said logic means comprise open-collector OR logic means.

3. The record media scanning apparatus of claim 1, in which the sensing means of said motor comprise Hall effect sensing means.

4. The record media scanning apparatus of claim 1, in which the detecting means comprises amplifier means for amplifying a signal from said laser power supply means and threshold comparator means coupled to said amplifier means.

5. A method of operation of a record media scanning apparatus having a laser and a method for driving a movable element forming part of said apparatus, comprising the following steps:
  initially turning the motor on and turning the laser off;
  turning the motor off and maintaining the laser off;
  determining that the motor is initially inoperative;
  turning on the motor and determining whether it reaches a predetermined minimum speed within a predetermined time period;
  providing a failure indication if said motor does not attain said minimum speed within said predetermined time period;
  turning on the laser if the laser is initially off and if said motor has attained said minimum speed;
  maintaining a continuing monitoring of motor speed and turning off said laser if motor speed drops below said predetermined minimum;
  monitoring the operator activity at the scanning apparatus and turning off said laser and said motor if there is no such operator activity for a predetermined period of time;
  after said period of inactivity has been exceeded and said laser and said motor have been turned off, determining whether there is motion representing operator activity in the vicinity of said record media scanning apparatus; and
  turning on said laser and said motor in response to the sensing of such motion representing operator activity.

6. The method of operation of claim 5, in which the step of providing a failure indication includes turning off the laser if it is on, assuring that the motor is on, and giving an indication which is detectable by the operator of the record media scanning apparatus.

7. The method of operation of claim 5, in which the step of maintaining a continuing monitoring of motor speed is accomplished by periodic checking of signals derived from rotation of said motor.

8. The method of operation of claim 7, in which said signals are generated by Hall effect devices associated with said motor.

* * * * *